3,091,646
PREPARATION OF M-CRESOL BY A DEALKYLATION PROCESS

Gerd Leston, Pittsburgh, Pa., assignor to Koppers Company, Inc., a corporation of Delaware
No Drawing. Filed Apr. 18, 1960, Ser. No. 22,683
3 Claims. (Cl. 260—621)

This invention relates to the dealkylation of tertiary alkylated phenols. In one specific aspect, it relates to the partial or complete dealkylation of ortho, para-di-tertiary alkylated meta-cresols. In another aspect, it relates to the preparation of para-monotertiary alkylated meta-cresols from an ortho,para-di-tertiary alkylated meta-cresol.

For many years, it has been the practice in the art to separate the meta- and para-isomers of cresol by an alkylation-dealkylation technique, since these isomers differ only by 0.8° C. in their boiling points and cannot be separated by fractional distillation. By alkylating a commercial mixture of meta- and para-cresol with a branched chain olefin such as isobutylene, there is obtained, for example, a di-tertiary-butyl-meta-cresol and di-tertiary-butyl-para-cresol. These alkylated materials can be easily separated by fractional distillation, since their boiling points are 17° C. apart. After separation they may be dealkylated to form relatively pure meta- and para-cresols.

Dealkylation of the di-tertiary alkyl phenols can be accomplished either thermally or with the aid of a catalyst. Thermal dealkylation was found to be inefficient and workers in the art resorted to catalytic dealkylation using relatively strong acid-acting catalysts, such as sulfuric acid, aluminum chloride, aluminum chloride-organic adducts tetraphosphoric acid and the like for liquid phase dealkylation, and silica, alumina, silica-alumina and active clays for vapor phase dealkylation.

Liquid phase dealkylation has generally been preferred to vapor phase dealkylation, since the latter requires high temperatures in the range of 350–550° C., expensive equipment, and regeneration facilities to reactivate the catalyst, which becomes inactive as a result of carbonaceous deposits formed on its surface during the reaction.

Among the liquid phase catalysts, sulfuric acid is most commonly used, since it is the least expensive and is readily commercially available. Unfortunately, there are numerous drawbacks to the use of sulfuric acid as a dealkylation catalyst. Because of its strength, sulfuric acid tends to cause polymerization of the olefin liberated during the dealkylation reaction and certain other undesirable side reactions. Furthermore, sulfuric acid and other strong acid catalysts produce extensive corrosion of the metal parts of the equipment in which the dealkylation is carried out.

In connection with the dealkylation of t-alkylated meta-cresols, sulfuric acid and other strong acid catalysts have an additional limitation. With these catalysts, the partial dealkylation of a material such as 4,6-di-t-butyl-m-cresol results uniformly in the formation of 6-t-butyl-m-cresol and m-cresol as products. It is thus not possible using these strong catalysts to prepare by partial dealkylation the para-mono-t-alkylated meta-cresols, such as 4-t-butyl-m-cresol, since the partial dealkylation results exclusively in the formation of the ortho isomer. 4-t-butyl-m-cresol is of particular interest, since it, unlike the ortho isomer, can be used in the synthesis of the useful antiseptic, thymol. 4-t-butyl-meta-cresol is also useful, when added in relatively small amounts, as an antioxidant for motor fuels, lubricating oils and greases, turbine oils, solvents, waxes and the like. It can be prepared directly by the alkylation of meta-cresol with sulfuric acid under extremely mild alkylating conditions as described in Stevens et al., U.S. 2,560,666. Unfortunately, the Stevens et al. process provides only low yields of this interesting product along with much larger amounts of other alkylated materials, such as t-butyl m-tolyl ether.

Quite surprisingly, I have discovered a novel dealkylation method by which I can partially or completely dealkylate ortho,para-di-t-alkyl-meta-cresols to obtain a substantial yield of 4-t-alkyl-m-cresol admixed with other products upon partial dealkylation or substantially quantitative yields of meta-cresol upon complete dealkylation. The branched chain olefin obtained as a coproduct of my new method is substantially pure and little or no polymerization thereof occurs during the dealkylation.

My method is based upon the use of an aluminum aryloxide as a dealkylation catalyst. Such catalysts were introduced to the alkylation art by George G. Ecke and Alfred J. Kolka, who found them to be efficient for the selective ortho-alkylation of phenolic bodies when used as described in U.S. Patent No. 2,831,898. Attempts to use the aluminum aryloxides as dealkylation catalysts were reported by Kolka et al, Journal of Organic Chemistry, 22, 642 (1957). Kolka et al. found that these catalysts served well for the dealkylation of ortho-t-alkylated materials, but that materials containing a tertiary-alkyl group in the para- or 4-position, such as 4-t-butyl phenol, could not be dealkylated using these catalysts even at temperatures as high as 236° C. (total reflux). The findings of Kolka et al. led workers in the art to believe that the aluminum aryloxides were suitable as dealkylation catalysts only for materials containing no tertiary alkyl group in the para-position. Unexpectedly, I have found that they are remarkably effective, when used according to my method described in detail hereafter, for the complete or partial dealkylation of ortho,para-di-tertiary-alkyl-meta-cresols. As I have noted, my partial dealkylation method results in the formation of substantial quantities of 4-t-alkyl-m-cresol, a material which could not heretofore be prepared by dealkylation techniques.

It is therefore an object of the present invention to provide a new and economical dealkylation process, whereby relatively pure meta-cresol and an isoolefin are obtained as coproducts in substantially quantitative yields. It is a further object to provide a partial dealkylation technique which makes it possible for the first time to prepare by dealkylation measurable quantities of 4-t-alkyl-meta-cresols.

In accordance with the invention ortho,para-di-t-alkyl-meta-cresols are dealkylated by heating an ortho,para-di-t-alkyl-meta-cresol in the presence of a catalytic amount of an aluminum aryloxide until dealkylation occurs. A meta-cresol from which at least one t-alkyl group has been removed is recovered from the reaction mixture. Dealkylation can be continued until both t-alkyl groups have been removed or, alternatively, it can be controlled, by measuring the amount of isoolefin evolved, to remove only one of the t-alkyl groups from most of the molecules. By the term dealkylation as used herein, I mean an operation in which tertiary alkyl groups are split off from the alkylated cresol without removing the methyl group.

The starting material for the process of the invention is an ortho,para-di-t-alkyl-meta-cresol, such as 4,6-di-t-butyl-meta-cresol or 4,6-di-t-amyl-meta-cresol. These materials are commonly prepared in alkylation processes for the separation of the meta- and para-cresol isomers.

The catalyst used in the invention is an aluminum aryloxide, such as aluminum phenoxide, aluminum m-toloxide and the like. These catalysts are prepared generally according to the technique described in Ecke et al., U.S. Patent 2,831,898; preferably they are made by reacting metallic aluminum, aluminum hydroxide or an aluminum alkoxide, such as aluminum ethoxide or aluminum isopropoxide, with a phenol or an alkylated phenol. Conveniently, the phenol used in the formation of the aluminum aryloxide is that being subjected to dealkylation in the process of the invention or one of those which is obtained as a dealkylation product. Thus, the preferred aluminum aryloxide for the dealkylation of an ortho,para-di-t-butyl-meta-cresol or an ortho, para-di-t-amyl-meta-cresol is aluminum m-toloxide (aluminum m-cresoxide).

The catalyst may be preformed or it may be formed in situ. To preform the catalyst substantially stoichiometric quantities of aluminum metal, preferably in the form of chips or a fine powder, and the desired phenol, e.g. phenol, m-cresol, p-cresol, or various alkylated phenols and cresols, are heated together at an elevated temperature of, for example, 100–250° C. As I have noted hereabove, aluminum alkoxides or aluminum hydroxide can be used in place of metallic aluminum to form the aluminum aryloxide. The catalyst is formed in situ by adding sufficient quantities of the aluminum or aluminum compound and the phenol to the reaction mixture prior to dealkylation. If the catalyst used is the aryloxide of the cresol to be dealkylated or the aryloxide of one of the intermediate products of dealkylation, it is necessary simply to add a sufficient quantity of aluminum (or aluminum compound) to the reaction mixture.

The amount of catalyst used ranges generally between about 0.01 and 5% by weight, based on the weight of the material to be dealkylated, although the preferred amount of catalyst varies to some extent with the degree of dealkylation desired. If less than 0.01% by weight of catalyst is used, dealkylation is quite slow. For economic reasons no advantage is seen in using greater than about 5% by weight catalyst, although no adverse effects are obtained thereby. For complete dealkylation, the amount of catalyst ranges preferably between about 0.1 and 2% by weight. For partial dealkylation, best results are obtained using less than 1% by weight catalyst, e.g., 0.05–0.75% by weight, for reasons given in detail hereafter.

The reaction is markedly endothermic. In the presence of large amounts of catalyst, viz. greater than about 1% by weight, dealkylation proceeds rapidly and it is difficult to maintain a reaction temperature in the upper portion of the necessary temperature range. In my new method the reaction temperature ranges between about 150° C. and 275° C. Below about 150° C. dealkylation is very slow and above about 275° C. it is not possible to operate in the liquid phase without the use of substantial positive pressure and the recovery of the coproduct isoolefin is more difficult.

Surprisingly, I have found that the upper portion of the temperature range, i.e., from about 200–275° C. is most desirable for my partial dealkylation process. In fact, the use of these higher temperatures is necessary, if one desires to obtain substantial quantities of 4-t-alkyl-m-cresol as a dealkylation product. Contrary to what would be expected from the teachings of Kolka et al., supra, I have found that, in the presence of an aluminum aryloxide, removal of the t-alkyl group in the para-position from an ortho,para-di-t-alkyl-m-cresol takes place preferentially, but very slightly so, over the removal of the t-alkyl group in the ortho position. However, the removal of the para-t-alkyl group proceeds at a slower rate than the removal of the ortho-t-alkyl group. Thus, it is possible, by subjecting the ortho,para-di-t-alkyl-m-cresol to more drastic conditions of dealkylation for a very short period of time, to remove ortho-t-alkyl groups from a substantial number of molecules without removing the para-t-alkyl groups, although during a dealkylation under such conditions, e.g. at temperatures of 230–260° C., para-t-alkyl groups are removed from some of the molecules.

In the case of 4,6-di-t-butyl-meta-cresol, the product of partial dealkylation under controlled conditions comprises a mixture of 4-t-butyl-meta-cresol, 6-t-butyl-meta-cresol, meta-cresol and some unreacted 4,6-di-t-butyl-meta-cresol. The ratio of 4-t-butyl-meta-cresol to 6-t-butyl-meta-cresol in the product mixture depends primarily on the temperature conditions and to a lesser extent on the catalyst and reaction time. As I have noted, to form the largest possible amount of 4-t-butyl-meta-cresol, dealkylation temperatures above 200° C. and preferably above 230° C. should be used. It is generally not advantageous to use more than about 1% catalyst for this purpose, since the presence of a large amount of catalyst causes the endothermic dealkylation reaction to proceed with such rapidity that it is difficult, because of the large amount of heat absorbed, to maintain the temperature at the desired level.

Dealkylation is most advantageously conducted at atmospheric pressure, although superatmospheric or subatmospheric pressures may be used in some instances. By working at atmospheric pressure, condensation or recovery of the evolved olefin is less difficult and continuous operation is facilitated. Slight positive pressures of e.g. 30–60 p.s.i. are sometimes helpful in that the size of the equipment may be reduced and refrigeration is not required to liquify and separate the evolved olefin. When it is desired to flash off the m-cresol formed during the reaction, reduced pressure can be used, but the recovery of the coproduct isoolefin becomes more difficult under such conditions.

The reaction time can be conveniently determined by measuring the amount of isoolefin removed from the reaction mixture. If the desired product is meta-cresol, substantially complete dealkylation can be ascertained by the removal of approximately two moles of isoolefin for each mole of the starting ortho,para-di-t-alkyl-meta-cresol. If only partial dealkylation is desired, the reaction is stopped after a fraction of the t-alkyl groups, i.e., from about 0.2 moles to 1 mole per mole of reactant, are removed as gaseous olefin.

The recovery procedure used varies with the degree of dealkylation. In the case of complete dealkylation the meta-cresol can be recovered from the reaction mixture by fractional distillation or by a flash distillation followed by fractional distillation. If desired, distillation can be carried out concurrently with the dealkylation. The bulk of the product can be removed in crude form by simple distillation and thereafter purified by a fractional distillation.

In the case of a partial dealkylation, the dealkylation products can be recovered in a variety of ways. The dealkylated mass can be subjected directly to a fractional distillation by operating under a reduced pressure of e.g. 20–50 mm. of Hg. Solid caustic can be added to the crude reaction mixture and the resulting mass can thereafter be fractionated to give m-cresol, 4-t-alkyl-m-cresol, 6-t-alkyl-m-cresol and unreacted 4,6-di-t-alkyl-m-cresol. Alternatively, a mineral acid can be added to the dealkylated mixture to destroy the catalyst. The aqueous and organic layers thus formed are separated and the products can be recovered by fractionation from the organic layer. Any aluminum oxide formed during the course of the reaction may be removed from the crude dealkylation mixture by adding water and filtering.

The mixed butylated cresols and meta-cresol can also be separated by extracting the dealkylated mass with dilute, aqueous sodium hydroxide. 6-t-butyl-meta-cresol and 4,6-di-t-butyl-meta-cresol are insoluble in dilute caustic and thus, they remain behind as a residue. The caustic-soluble materials, meta-cresol and 4-t-butyl-meta-cresol can be recovered from the extract by neutralizing it with a relatively dilute solution of a mineral acid, such as hydrochloric acid. The accepted physical characteristics of the components of the partially dealkylated mixture are shown hereunder in Table I:

TABLE I

| | Soluble in 10% NaOH | Melting Point, °C. | Boiling Point, °C./20 mm. |
| --- | --- | --- | --- |
| metacresol | Yes | 11.5 | 100 |
| 4-t-butyl-3-methylphenol | Yes | 72–73 | 152–153 |
| 6-t-butyl-3-methylphenol | No | 21.3 | 120 |
| 3-methyl-4,6-di-ti-butylphenol | No | 62.1 | 167 |

The complete or partial dealkylation may be made continuous by feeding fresh di-t-alkyl-meta-cresol to the reaction mixture as the dealkylation takes place. In a batch operation, after removal of the product or products, the catalyst may be recycled for use in a subsequent run.

My invention is further illustrated by the following examples:

Example I

A 300 ml. flask was charged with 165 g. (0.75 mole) of 4,6-di-t-butyl-meta-cresol. The aluminum aryloxide was formed in situ by adding 0.75 g. (3.68 millimoles) of aluminum isopropoxide, giving a catalyst concentration of 0.77% by weight as aluminum m-toloxide. The flask was attached to an 18″ Vigreux column and the reaction mixture was heated to a temperature at which incipient distillation occurred. Over a period of four hours, there was distilled 78.5 g. of material, identified as meta-cresol by infrared analysis. The amount of product recovered corresponded to 97% of theory. The reaction residue weighed 5.7 g.

Example II

A charge of 165 g. (0.75 mole) of 4,6-di-t-butyl-meta-cresol was added to the residue obtained in the previous example and dealkylated according to the procedure described therein. A Dry Ice-cooled trap was attached to the system to trap the more volatile components. Over a period of three hours 80 g., corresponding to 99% of theory, of meta-cresol was distilled off. The Dry Ice-cooled trap contained 80.5 g. of a colorless liquid of which all but 0.8 g. vaporized at room temperature. The volatile material, 79.7 g., represented a 95% yield of isobutylene.

Example III

A 500 ml. flask was charged with 330 g. (1.5 moles) of 4,6-di-t-butyl-meta-cresol and 5 g. of aluminum aryloxide catalyst, made by refluxing 0.1 g. (3.86 millimoles) aluminum turnings in 5 g. of meta-cresol. The catalyst concentration was 0.39% by weight. A reflux condenser was attached to the flask, and this in turn was attached to a Dry Ice-cooled trap. The reaction mixture was heated at reflux temperature for 4.5 hours (until the evolution of gas ceased). There was obtained 155.1 g. of isobutylene, representing 92.5% of theory, although it was observed that an additional quantity was lost from the trap. The residue, 173.7 g., was distilled from the catalyst through an 18″, 14 mm. I.D. glass helix-packed column. The yield of pure meta-cresol thus obtained was 158.2 g., representing 98% of theory.

Example IV

The apparatus used in the previous examples was charged with 220 g. (1 mol) of 4,6-di-t-butyl-meta-cresol and 0.1 g. of aluminum turnings. The mixture was refluxed and the aluminum dissolved slowly. After eight hours, the head temperature had reached 200.5° C., and 107.2 g. of volatile material and .8 g. residue had been isolated in the Dry Ice-cooled trap. Distillation was then begun. Upon distillation there was obtained 104.9 g. of meta-cresol, representing 98% of theory. The total isobutylene recovered was 108.4 g. (97% of theory).

Similar results are obtained using 4,6-di-t-amyl-m-cresol as a starting material.

Example V

Following the procedure of the preceding examples 55 g. (0.25 mole) of 4,6-di-tertiary-butyl-meta-cresol was partially dealkylated with an aluminum aryloxide catalyst formed in situ by adding 0.25 g. of aluminum isopropoxide to the reaction mixture. The mixture was heated slowly, and as vaporization began at a pot temperature of 150° C., a reflux condenser was inserted. Gas evolution started at 220° C. and heating was continued at 220–250° C. for 1.75 hours. 8.5 g. of isobutylene was recovered in the trap. Infrared analysis indicated the residue to be 51% by weight 4,6-di-t-butyl-metal-cresol, 19% 6-t-butyl-meta-cresol, 16% 4-t-butyl-meta-cresol and 5% meta-cresol. By recycling the unreacted 4,6-di-t-butyl-meta-cresol, the ultimate yield of 4-t-butyl-meta-cresol is 32.4% (mole basis).

Example VI

A partial dealkylation was run by substantially repeating the conditions of Example V, with the exception that the temperature was kept below 230° C. Over a two hour period, 3.98 liters of gas was evolved from the 55 g. of 4,6-di-t-butyl-meta-cresol (to which was added 0.25 g. aluminum isopropoxide). This gas evolution corresponded to 8.9 g. of isobutylene. Infrared analysis showed that the reaction product contained 50% by weight 4,6-di-t-butyl-meta-cresol, 19% 6-t-butyl-meta-cresol, 11% 4-t-butyl-meta-cresol and 6% meta-cresol. The ultimate yield of 4-t-butyl-meta cresol was thus 21.5% (mole basis).

Example VII

A partial dealkylation was conducted substantially according to the conditions described in Example VI with the exception that aluminum m-toloxide, made by reacting 0.05 g. of aluminum and 2 g. meta-cresol, was used as a catalyst. A 44 g. quantity of 4,6-di-t-butyl-meta-cresol was partially dealkylated over a two hour period at a temperature ranging between 232 and 211° C. An 11.3 g. quantity of isobutylene was recovered in the trap. The weight loss of the reaction mixture was 10.5 g., which signified that one mole of isobutylene (per mole of 4,6-di-t-butyl-meta-cresol) had been removed.

Example VIII

A flask was fitted with an outlet tube and a thermometer and charged with 55 g. (0.25 mole) of 4,6-di-t-butyl-meta-cresol and 0.25 g. of concentrated sulfuric acid. The mixture was heated with occasional shaking for 2.5 hours while the temperature rose slowly from 100 to 135° C. A 7.6 g. quantity of isobutylene was collected in a trap and the total weight loss of the residue was found to be 9.5 g. Infrared analysis of the residue showed that it consisted of approximately 25% by weight 4,6-di-t-butyl-meta-cresol and 75% 6-t-butyl-meta-cresol. There was no 4-t-butyl-meta-cresol or meta-cresol present in the residue. This experiment clearly shows that using the conventional strong acid dealkylating catalysts, it is not possible to make 4-t-butyl-meta-cresol.

I have thus provided a new dealkylation method which is effective in the partial or complete dealkylation of 4,6-di-t-alkyl-meta-cresols. Complete dealkylation gives substantially quantitative yields of pure meta-cresol and yields of 95% and higher of polymer-free isoolefin. Dealkylation can be performed and the product can be removed without destroying the catalyst, thus greatly reducing process costs. The process is readily adaptable to continuous operation.

By partial dealkylation under the more drastic conditions of my method, I have obtained 4-t-butyl-meta-cresol in the highest known conversions and ultimate yields without the formation of byproducts such as t-butyl m-tolyl-ether. The best heretofore known process for making 4-t-butyl m-cresol is that of Stevens et al., U.S. 2,560,666 supra. The yields obtainable by the Stevens et al. process do not exceed 6.6% per pass, as is reported in an article by Donald R. Stevens appearing in the Journal of Organic Chemistry 20, 1232 (1955).

I claim:

1. A method of making m-cresol comprising heating a 4,6-di-t-alkyl-m-cresol at a temperature of 150°–275° C., in the presence of a catalytic amount of an aluminum aryloxide selected from the group consisting of phenoxide and lower alkyl phenoxide, until about two moles of isoolefin per mole of 4,6-di-t-alkyl-m-cresol are evolved, and recovering m-cresol from the reaction mixture.

2. A method of making m-cresol comprising heating 4,6-di-t-butyl-m-cresol at a temperature of 150–275° C. in the presence of 0.1–2% by weight of aluminum m-toloxide, based on the weight of 4,6-di-t-butyl-m-cresol, until about 2 moles of isobutylene per mole of 4,6-di-t-butyl-m-cresol are evolved, and recovering m-cresol from the reaction mixture by distillation.

3. Method according to claim 2 wherein the reaction temperature is 200°–275°.

References Cited in the file of this patent

UNITED STATES PATENTS

| | | |
|---|---|---|
| 2,297,588 | Stevens et al. | Sept. 29, 1942 |
| 2,831,898 | Ecke et al. | Apr. 22, 1958 |

OTHER REFERENCES

Kolka et al.: Jour. Organic Chem., 22: 642–646 (1957), 260–624(E) (5 pages).

Bowman et al.: Jour. Amer. Chem. Soc., 79: 87–92 (1957), 260–624(E) (6 pages).